May 31, 1966  D. M. PETERSON  3,253,797
DEMONSTRATION MAGAZINE FOR CAMERA
Filed Feb. 21, 1963  2 Sheets-Sheet 1

Dean M. Peterson
INVENTOR.

BY R. Frank Smith
Steve W. Grambau
ATTORNEYS

United States Patent Office 3,253,797
Patented May 31, 1966

3,253,797
DEMONSTRATION MAGAZINE FOR CAMERA
Dean M. Peterson, Rochester, N.Y., assignor to Eastman Kodak Company, Rochester, N.Y., a corporation of New Jersey
Filed Feb. 21, 1963, Ser. No. 260,155
2 Claims. (Cl. 242—71.2)

This invention relates generally to film magazines, and more specifically to a demonstrator magazine for still cameras in which a web, simulating a strip of film, contained therein is returned to its original position in the magazine from any position to which it has been advanced.

One problem encountered in the sale of cameras of the type adapted to receive roll-film magazines has been the inability to demonstrate the camera to a prospective customer with a film therein. Normally, the customer desires to observe the camera operated under conditions that most closely simulate actual operating conditions. To accomplish this in the past, it has been necessary to use a film magazine loaded with unexposed film. By using a magazine of this type, it is possible to demonstrate how the film metering and shutter mechanisms operate to make an exposure. A demonstration of this type in which the film advance can be observed through the window in the camera back is very effective. However, the disadvantage of such a demonstration is obvious, namely the ruining by exposure of a perfectly good roll of film. This disadvantage is eliminated by applicant's new improved reusable roll-film magazine which is loaded with a web of material, simulating a roll film, and which is contained in the magazine so that upon completion of the demonstration it will automatically return to its original rolled position upon retraction of the film advance mechanism of the camera from the magazine.

One of the primary objects of the present invention is to provide an improved reusable demonstrator roll film magazine for a still camera having a strip of light-insensitive material which may be advanced in the normal manner by the film advance mechanism in order to demonstrate the operation of the camera, and will automatically return to its original position upon withdrawal of the film advance mechanism from the magazine.

Another object of the invention is the provision of a demonstrator magazine for a still camera that is reusable for repetitive demonstration of the features of both the magazine and the camera.

A more specific object of the invention is to provide a reusable demonstrator magazine for a still camera having a supply roll of light-insensitive web material which may be advanced by the film advance mechanism of the camera in the normal way to demonstrate the operation of the magazine and camera, and in doing so will tension a spring in the supply roll which will automatically return the web to its normal rolled up condition in the magazine when the film advance mechanism of the camera is disconnected from the magazine.

Objects and advantages other than those set forth above will be apparent from the following description when read in connection with the accompanying drawings, in which.

Figure 3:
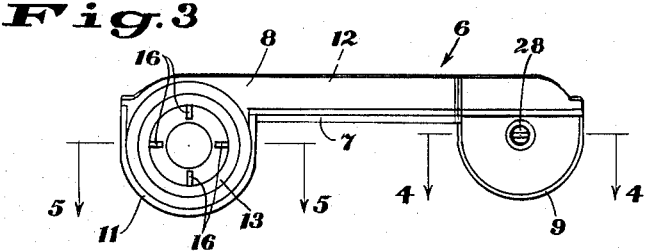
FIG. 3 is a side view of the magazine of FIG. 1.

The magazine in which applicant's invention is embodied is essentially the same as the magazine disclosed in U.S. application Serial No. 163,843, filed January 2, 1962, in the name of Hubert Nerwin. This magazine 6 essentially comprises a molded plastic magazine body 7 and a molded plastic magazine cover 8 joined together around their edges to form spaced apart supply and take-up chambers 9, 11 respectively, connected by a passageway 12. A molded plastic take-up spool 13 (see FIG. 5) has grooved flanges 14 rotatably supported by ribs 15 formed on those parts of the body 7 and cover 8 cooperating to form the take-up chamber 11. Each flange 14 of spool 13 is provided on its outer surface with a plurality of radial lugs 16 (see FIG. 3) engageable by a corresponding drive gear or lug, not shown, of any suitable film advance mechanism of the type disclosed in U.S. patent application Serial No. 217,863, filed August 20, 1962, in the name of Dean M. Peterson, now Patent No. 3,106,142.

Figure 4:
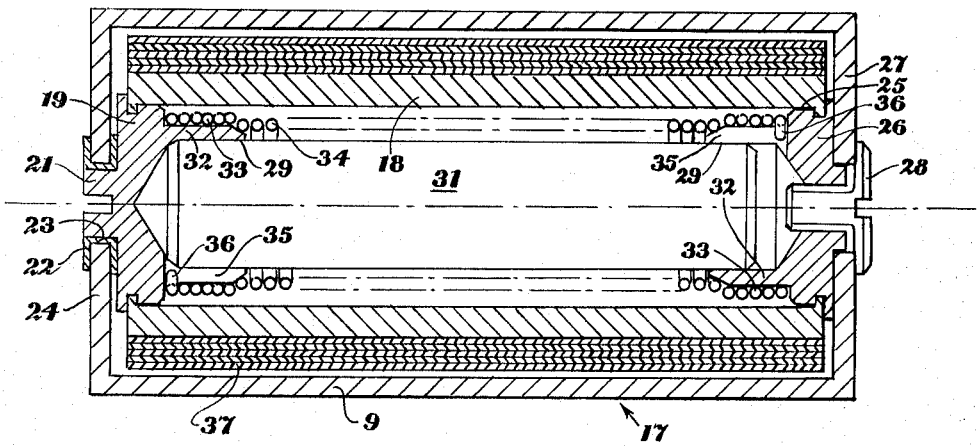
FIG. 4 is an enlarged section view taken along line 4—4 of FIG. 3.

A supply spool 17 (see FIG. 4) is mounted in supply chamber 9 and comprises a drum 18 having one end secured to a hub 19 by a press fit or the like. The hub 19 has a stub shaft 21 journaled in an annular bearing 22 surrounding an opening 23 in one side 24 of supply chamber 9. The opposite end of drum 18 is rotatably mounted on an annular shoulder 25 formed by a hub 26 which is secured to the opposite side 27 of supply chamber 9 by a screw 28. Each of hubs 19 and 26 has a bore 29 for loosely receiving the end of a rod 31, and annular portions 32 of reduced diameter for receiving end portions 33 of a helical spring 34. Each portion 32 further has an axially extending slot 35, and each end of the spring 34 has a radially inwardly extending tab 36 which extends into its corresponding slot 35 for securing each spring end 33 to its respective hub.

The drum 18 and hub 19 are rigidly secured together as a rotatable unit. During rotation, the stub shaft 21 is rotatably supported by bearing 22, and the opposite end of drum 18 is rotatably supported by shoulder 25 of fixed hub 26. Since one end of the spring 34 is connected to fixed hub 26, and the opposite end connected to rotatable hub 19, rotation of drum 18 will tension spring 34. Upon release of drum 18, the spring 34 will return to its normal, untensioned position, and will return drum 18 to its start position.

Figure 1:
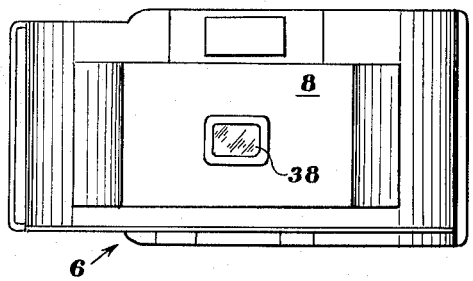
FIG. 1 is a back elevational view of a magazine in which the invention is embodied.
Figure 2:
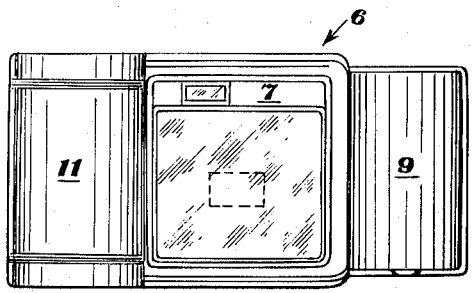
FIG. 2 is a bottom front elevational view of the magazine of FIG. 1.
Figure 5:
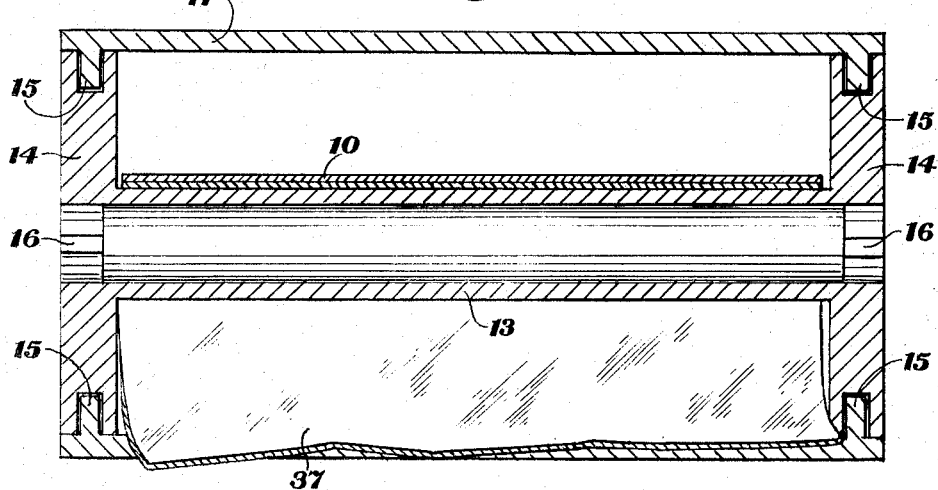
FIG. 5 is an enlarged section view taken along line 5—5 of FIG. 3.

A web 37 of light-insensitive material of any suitable type has one end thereof secured to take-up spool 13 by an adhesive paster 10 or the like shown in section in FIG. 5, and the opposite end secured to drum 18 by a similar paster, not shown. The web 37 is further provided with spaced identification indicia such as numerals, or notches, not shown, which are visible through an aperture 38 (see FIG. 1) in magazine cover 8. The magazine aperture 38 is further in alignment with a window in a hinged camera back, not shown, as is well known in the art. In the normal condition of the magazine 6, the supply spool 17 is in its untensioned position with web 37 wound thereon in the form of a roll, and with its opposite end secured to the take-up spool 13. The adhesive paster, identification indicia, and camera window are all disclosed in the aforementioned U.S. application Serial No. 163,843.

In the operation of this invention, the magazine 6 is placed in any suitable camera of the type disclosed in the aforementioned U.S. application Serial No. 217,863, and the film advance mechanism of the camera is moved into driving engagement with the drive lugs 16 of take-up spool 13. With the camera back closed, the aperture 38 in magazine cover 8 is visible through the window in the camera back. By operating the film advance mechanism of the camera, the operator will cock the shutter and drive the take-up spool 13 of magazine 6, unwinding web 37 from spool 17 against the bias of spring 34, and winding it onto take-up spool 13. As each frame increment of length of web 37 representative of a frame of film is advanced by the film advance mechanism of the camera, the operator will be aware of this by observing the exposure-indicating indicia through the aligned aperture 38 and window. This will, of course, indicate whether the film advance mechanism of the camera is operating satisfactorily. As soon as the operator is convinced that the camera is operating satisfactorily, the film advance mechanism of the camera is retracted out of engagement with the drive lugs 16 on take-up spool 18 releasing the tensioned spring 34 which immediately rewinds web 37 from take-up spool 13 and back onto supply spool 17 as it returns to its normal untensioned position. The film advance mechanism of the camera is provided with a one-way clutch, not shown, so that the film advance mechanism, when operated, will drive th etake-up spool 13 in a direction to wind up the web 37 thereon, but will prevent the take-up spool 13 from rotating in the opposite direction as long as the film advance mechanism is in engagement therewith.

The invention has been described in detail with particular reference to a preferred embodiment thereof, but it will be understood that variations and modifications can be effected within the spirit and scope of the invention as described hereinabove, and as defined in the appended claims.

I claim:

1. In a demonstration magazine for a camera of the type having a web advance mechanism movable into and out of driving engagement with a take-up spool of said magazine, the combination comprising:
   a body having a first hub member secured thereto at one end of said body;
   said first hub member having (1) a first bore at one end, (2) a first cylindrical shoulder of one diameter having an axially extending first slot therein, and (3) a second cylindrical shoulder of greater diameter;
   a supply spool rotatably supported at said one end of said body;
   said supply spool having a web wound thereon with one end connected to said supply spool;
   said supply spool comprising a second hub member having (1) a stub shaft at one end rotatably supported by said body in axial alignment with said first hub member, (2) a second bore at its other end in axial alignment with said first bore, and (3) a third cylindrical shoulder of substantially the same diameter as said first shoulder and having an axially extending second slot therein;
   said supply spool further comprising a drum having one end rotatably mounted on said second shoulder, and its other end secured to said second hub member;
   a take-up spool rotatably supported at the other end of said body, and having the opposite end of said web secured thereto; and
   a spring positioned within said drum and having one end encircling said first shoulder with a part of said end extending into said first slot, and said other end of said spring encircling said third shoulder with a part of said end extending into said second slot, said spring adapted to be tensioned when said web advance mechanism is moved into driving engagement with said take-up spool for driving said take-up and supply spools in one direction to advance said web from said supply spool onto said take-up spool, said tensioned spring automatically rotating said drum in the opposite direction to rewind said web onto said supply spool when said web advance mechanism is moved out of driving engagement with said take-up spool.

2. The invention according to claim 1 wherein said supply spool further has a rod having one end extending into said first bore, and its other end extending into said second bore, forming an annular space between the periphery of said rod and the inner surface of said drum, said spring being disposed in said annular space.

References Cited by the Examiner

UNITED STATES PATENTS

| 338,398 | 3/1886 | Fuller | 40—89 |
| 426,693 | 4/1890 | Stimson | 40—89 |
| 536,473 | 3/1895 | Maconachie | 242—107.7 |
| 903,537 | 11/1908 | Bignold | 40—85 X |
| 910,419 | 1/1909 | Schell | 242—107 |
| 1,217,444 | 2/1917 | Hardy | 242—71.6 |
| 1,257,874 | 2/1918 | Jordan | 242—71.6 |
| 1,956,938 | 5/1934 | Wood et al. | 242—107.4 X |
| 2,267,209 | 12/1941 | Morando | 242—107 |
| 2,865,514 | 12/1958 | Goodman | 242—107.6 X |
| 3,008,661 | 11/1961 | Estes et al. | 242—55.13 |
| 3,043,187 | 7/1962 | Shaffer | 242—71.2 X |
| 3,138,084 | 6/1964 | Harvey | 242—67.5 X |

FOREIGN PATENTS 261,175  11/1926  Great Britain.

MERVIN STEIN, *Primary Examiner.*

N. L. MINTZ, W. S. BURDEN, *Assistant Examiners.*